April 24, 1951 R. F. CORBETT 2,549,757

REPRODUCING DEVICE HAVING LINK MEANS FOR PRODUCING
HIGH COMPLIANCE IN THE DIRECTION
OF THE STYLUS DRAG

Filed March 20, 1947

WITNESSES:
H. J. Susser.
F. E. Browder

INVENTOR
Ray F. Corbett.
BY
Hymen Diamond.
ATTORNEY

Patented Apr. 24, 1951 2,549,757

UNITED STATES PATENT OFFICE 2,549,757

REPRODUCING DEVICE HAVING LINK MEANS FOR PRODUCING HIGH COMPLIANCE IN THE DIRECTION OF THE STYLUS DRAG

Ray F. Corbett, Lewisburg, Pa., assignor to Westinghouse Electric Corporation, East Pittsburgh, Pa., a corporation of Pennsylvania Application March 20, 1947, Serial No. 736,038

10 Claims. (Cl. 179—100.41)

This invention relates to pickup devices, such as used for reproducing sound from lateral cut disc records, cylinders, tapes, and the like, and has for an object to provide improved apparatus of this kind.

In the prior art devices, of which I am familiar, a stylus or needle tracks in a previously cut record groove to reproduce sound that is recorded by the record groove. This needle or stylus is mechanically connected to a transducer which translates the movements of the stylus or needle into electrical impulses. These electrical impulses are amplified and then audibly reproduced by some such device as a loudspeaker. Devices of this type are not entirely satisfactory because vertical movement of the stylus or needle and what is commonly referred to as needle drag also excites the transducer and these movements of the needle or stylus are audibly reproduced as noise. This noise often dominates the intelligence that is reproduced from the record and is sometimes very annoying.

Accordingly, it is another object of this invention to provide an improved pickup device of the type comprising a needle or stylus and a transducer wherein movement of the needle or stylus which would ordinarily produce noise will have little effect on the transducer.

A still further object is to provide an improved pickup device for reproducing records comprising a needle or stylus and a transducer for converting movement of the needle or stylus into electrical impulses, wherein the effect on the transducer by movement of the needle or stylus in a direction other than the direction for reproduction has little effect on the transducer.

A still further object is to provide improved apparatus for reproducing records, comprising a needle or stylus wherein the effect of vertical movement of the needle or stylus is damped.

A still further object is to provide improved apparatus for reproducing records comprising a needle or stylus wherein the effect of drag of the needle or stylus is damped.

Figure 1:
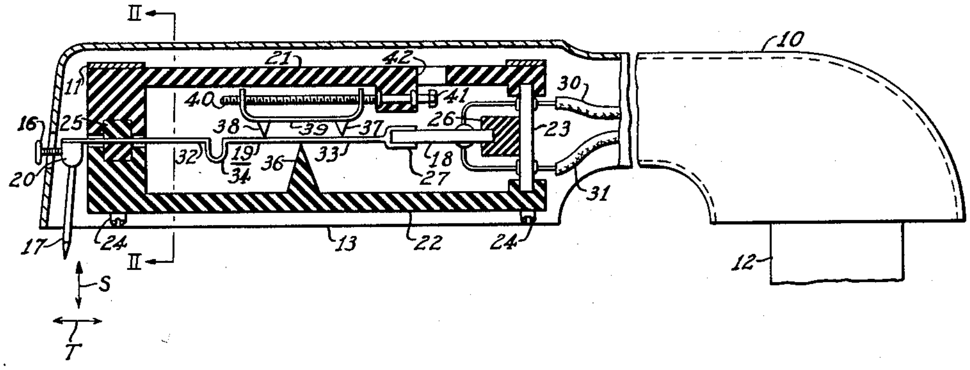
Figure 2:
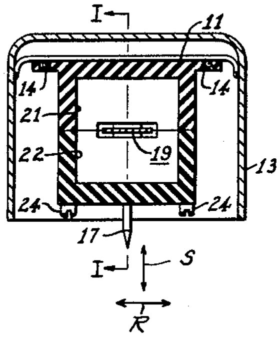

These and other objects are effected by my invention as will be apparent from the following description and claims taken in accordance with the accompanying drawing, forming a part of this application, in which:

Figure 1 shows my improved pickup device mounted for use with a conventional tone arm, with parts cut away as indicated by line I—I of Fig. 2 for clarity of illustration; and, Fig. 2 is a sectional view taken on line II—II of Figure 1.

Referring to Figure 1 in detail, I show my improved pickup device, mounted for use with a standard type tone arm 10. The tone arm is pivoted at 12 and has a hollow head portion 13 at its forward end. My improved pickup device is positioned inside the hollow head 13 as a unit and is retained therein by any suitable means, such as screws 14 which extend through holes in a flange on the pickup device and engage a portion 11 of the hollow head 13.

My pickup device comprises a needle or stylus 17, a mechano-electrical transducer 18, and a flat link member 19 connecting the needle or stylus 17 to the transducer 18. The needle or stylus 17 may be of any conventional type and it is attached to the link member 19 by a socket member or holder 20 and a screw 16.

The transducer 18 may be of any satisfactory type, however, for the purpose of illustration I have shown a crystal transducer of the bender type.

The pickup device is assembled in the form of a cartridge which comprises an upper member 21, a lower member 22, and an end wall 23. The members that make up the cartridge are held in assembled relationship by four screws 24. The link member 19 extends through a slot in the front end of the cartridge and a damper 25, of some suitable material, such as rubber, surrounds the link member 19 at this point and serves to dampen the internal self-vibrations of the link member 19. The crystal 18 is attached to the rear wall of the cartridge by some suitable means, such as a rubber member 26. The crystal 18 is connected to the link member 19 by inserting an edge of the crystal into a U-shaped portion 27 provided on the rear end of the link member 19. The crystal 18 is connected to a suitable audio amplifier by electrical conductors 30 and 31 which are connected to opposite sides of the crystal 19 and extend through the rear wall of the cartridge.

The link member 19 is a thin, flat metal member, having a much greater width than depth; however, it is understood that this link may be formed from any suitable material. This link has a high distributed compliance in the portions 32 and 33 for movement of the needle in the direction of the arrows S in Figs. 1 and 2, which would be vertical movement when the device is being used on lateral cut disc records. A U-shaped portion is formed at 34 to provide a high lumped compliance for needle drag, or movement of the needle in the direction indicated by the arrow T in Figure 1. This lumped compliance also assists in damping movement of the needle in the direction of the arrows S in Figs. 1 and 2. However, since the relative width of the link is much greater than its thickness, as seen in Fig. 2, the link 19 has a very low compliance for movement of the needle 17 in the direction of the arrow R, Fig. 2, which is the direction of movement for reproduction of lateral cut records.

A support member 36 is provided below the portion 33 of the link 19. A pair of bearing members 37 and 38, fixed relative to each other, are provided above the portion 33. The members 37 and 38 are attached to a bracket 39, which is threaded onto a screw 40. The screw 40 is mounted onto the upper member 21 of the cartridge. By turning the head 41 of the screw 40, the bearings 37 and 38 may be moved longitudinally of the link member 19 and relative to the support member 36. By so adjusting the bearings 37 and 38, the effect of the compliance of the link 19 may be regulated. An opening 42 is provided in the cartridge to permit operation of the screw 40 without having to disassemble the cartridge.

During the playing of lateral cut records with my pickup device, vertical movement of the needle or stylus 17 in the direction of arrows S, Figs. 1 and 2, is absorbed by the distributed compliance in the portions 32 and 33 and the lumped compliance at 34, and needle drag in the direction of the arrow T, Fig. 1, is absorbed by the lumped compliance at 34 and, consequently, these movements of the needle or stylus 17 have very little effect on the crystal 18, and therefore, contribute very little to noise. However, movement of the needle or stylus 17 in the direction of the arrow R, Fig. 2, which is the direction of reproduction for lateral cut records produces maximum excitation of the crystal 18.

From the foregoing description taken in connection with the drawing, it is seen that I have provided an improved pickup device wherein movement of the needle or stylus in directions other than the direction of reproduction is damped so that such movement has little effect on the transducer, and, therefore, does not contribute to noise and distortion in the output during the reproduction of lateral cut records, while maximum effect on the transducer is produced by movement of the needle or stylus in the direction of reproduction.

My invention has herein been described as embodied in a reproducing system. In its broader aspects, my invention is also applicable to a recording equipment.

While I have shown my invention in only one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

I claim as my invention:

1. In a device for reproducing sound from records, a stylus, a stylus holder, a transducer, a link comprising compliance connecting said stylus holder to said transducer, and means comprising an adjustable bearing coacting with and movable with respect to said link for regulating the amount of said compliance.

2. In a device for reproducing sound from records, a stylus, a transducer, a link comprising compliance connecting said stylus to said transducer, and a fixed support and a pair of adjustable bearings coacting with said link for regulating the effect of said compliance.

3. In a device for reproducing sound from lateral cut records, a needle, a needle holder, a crystal transducer, a link connecting said needle holder to said crystal, said link comprising high compliance for movement of said needle in directions other than the direction of reproduction and low compliance for movement of said needle in the direction for reproduction, and an adjustable bearing coacting with said link intermediate said needle and said transducer for varying the amount of said compliance.

4. In a pick-up device for reproducing sound from lateral cut records, a transducer, a stylus, a link connecting said stylus to said transducer for transmitting lateral movement of said stylus to said transducer, and adjusting means coacting with said link intermediate said stylus and said transducer for varying the effective compliance of said link.

5. In a pick-up device for reproducing sound from lateral cut records, a transducer, a stylus, a link connecting said stylus to said transducer for transmitting lateral movement of said stylus to said transducer, and adjusting means comprising a fixed support and a movable bearing coacting with said link intermediate said stylus and said transducer for varying the effective compliance of said link.

6. In a pick-up device for reproducing sound from lateral cut records, a transducer, a stylus, a link connecting said stylus to said transducer for transmitting lateral movement of said stylus to said transducer, and adjusting means comprising a fixed support and a pair of movable bearings coacting with said link intermediate said stylus and said transducer for varying the effective compliance of said link.

7. In a pick-up device for reproducing sound from grooves of lateral cut records, a cartridge, a transducer adjacent to one end of said cartridge, a stylus for engaging in the grooves of said records adjacent to the other end of said cartridge, a link for transmitting movement of said stylus to said transducer to excite said transducer, said link being attached to said transducer and extending through the end of said cartridge adjacent said stylus, and means attaching said stylus to said link, and means within said link for enabling it to have high lumped compliance for movement in the direction of stylus drag on said record, said means being located within said cartridge.

8. In a pick-up device for reproducing sound from grooves of lateral cut records, a cartridge, a transducer adjacent to one end of said cartridge, a stylus for engaging in the grooves of said records adjacent to the other end of said cartridge, a link connecting to said transducer and extending through the end of said cartridge adjacent said stylus, and means attaching said stylus to said link so that movement of said stylus excites said transducer, and means within said link for enabling said link to have high lumped compliance for movement in the direction of stylus drag on said record, said means being located within said cartridge, said link having low compliance in the direction of reproduction.

9. In a pick-up device for reproducing sound from grooves of lateral cut records, a cartridge, a transducer adjacent to one end of said cartridge, a stylus for engaging in the grooves of said records adjacent to the other end of said cartridge, a link connecting to said transducer and extending through the end of said cartridge adjacent said stylus, means attaching said stylus to said link so that movement of said stylus excites said transducer, and means within said link for enabling said link to have high lumped compliance for movement in the direction of stylus drag on said record, said means being located within said cartridge, said link having low compliance in the direction of reproduction, and means including a fixed support located within said cartridge intermediate said stylus and said transducer and an adjustable bearing on opposite sides of said fixed support and on the opposite side of said link from said fixed support for adjusting the effective compliance of said link.

10. In a pick-up device for reproducing sound from grooves of lateral cut records, a cartridge, a transducer attached to one end of said cartridge, a stylus for engaging in the grooves of said records adjacent to the other end of said cartridge, a link for transmitting movement of said stylus to said transducer to excite said transducer, said link being attached to said transducer and extending through the end of said cartridge adjacent to said stylus, means attaching said stylus to said link, means within said link for enabling it to have high lumped compliance for movement in the direction of stylus drag on said record, said means being located within said cartridge, and means including a fixed support and an adjustable bearing located within said cartridge on opposite sides of said link for adjusting the effective compliance of said link.

RAY F. CORBETT.

REFERENCES CITED

The following references are of record in the file of this patent:

UNITED STATES PATENTS

| Number | Name | Date |
|---|---|---|
| 1,977,433 | Dunning | Oct. 16, 1934 |
| 2,092,884 | Kendall | Sept. 14, 1937 |
| 2,239,717 | Hunt | Apr. 29, 1941 |
| 2,294,320 | Ritzmann | Aug. 25, 1942 |
| 2,320,416 | Dally | June 1, 1943 |
| 2,320,427 | Geudon | June 1, 1943 |
| 2,348,526 | Dally | May 9, 1944 |
| 2,320,427 | Geudon | June 1, 1943 |
| 2,348,526 | Dally | May 9, 1944 |
| 2,381,861 | Bauer | Aug. 14, 1945 |
| 2,388,116 | Buderlin | Oct. 30, 1945 |
| 2,426,061 | Snepvangers | Aug. 19, 1947 |
| 2,451,221 | Hutter | Oct. 12, 1948 |
| 2,469,265 | Hathaway | May 3, 1949 |